US009443077B1

(12) United States Patent
Dingle et al.

(10) Patent No.: US 9,443,077 B1
(45) Date of Patent: Sep. 13, 2016

(54) FLAGGING BINARIES THAT DROP MALICIOUS BROWSER EXTENSIONS AND WEB APPLICATIONS (71) Applicant: GOOGLE INC., Mountain View, CA (US)

(72) Inventors: Eric Dingle, Montreal (CA); Navdeep Singh Jagpal, Montreal (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/141,118

(22) Filed: Dec. 26, 2013

(51) Int. Cl.
*G06F 21/50* (2013.01)
*G06F 21/52* (2013.01)

(52) U.S. Cl.
CPC .................... *G06F 21/52* (2013.01)

(58) Field of Classification Search
CPC ...... G06F 21/52; G06F 21/53; G06F 9/3004; G06F 21/56; H04L 63/14
USPC .......................................................... 726/22
See application file for complete search history.

(56) References Cited

U.S. PATENT DOCUMENTS

| 8,255,280 B1* | 8/2012 | Kay et al. ..................... 705/26.1 |
| 8,286,250 B1* | 10/2012 | Le et al. .......................... 726/25 |
| 2004/0117760 A1* | 6/2004 | McFarling .............. G06F 8/443 717/101 |
| 2005/0195390 A1* | 9/2005 | Jeon ..................... G06F 11/3688 356/237.2 |
| 2007/0022324 A1* | 1/2007 | Chang ................ G06F 11/3672 714/38.14 |
| 2009/0183227 A1* | 7/2009 | Isaacs et al. ....................... 726/1 |
| 2010/0122271 A1* | 5/2010 | Labour et al. ................. 719/328 |
| 2011/0185424 A1* | 7/2011 | Sallam ............................ 726/23 |
| 2012/0291129 A1* | 11/2012 | Shulman et al. ................ 726/23 |
| 2013/0311976 A1* | 11/2013 | Bhat .................... G06F 11/3684 717/130 |

FOREIGN PATENT DOCUMENTS

CN 102662840 A * 9/2012 ............. G06F 11/36

* cited by examiner

*Primary Examiner* — Izunna Okeke
(74) *Attorney, Agent, or Firm* — Brake Hughes Bellermann LLP (57) ABSTRACT

A program binary file is identified as part of a webpage, where the file can be downloaded from the webpage for execution by a client. A browser-executable web application or browser extension that is installed on a client computing device as a consequence of executing the program binary is identified, where source code for the web application or browser extension includes scripting language code. The source code of the web application or browser extension is re-written to include tracking code to track behavior during execution of the re-written web application or browser extension. It is determined whether execution of the re-written web application or browser extension violates one or more predetermined conditions. Then, it is determined whether to discourage downloading the program binary from the webpage to the client computing device or whether to disable execution of the web application or browser extension on the client.

19 Claims, 5 Drawing Sheets

FLAGGING BINARIES THAT DROP MALICIOUS BROWSER EXTENSIONS AND WEB APPLICATIONS

TECHNICAL FIELD

This disclosure relates vetting web extensions and applications and, in particular, to flagging binaries that drop malicious browser extensions and web applications.

BACKGROUND

Browser-executed web applications and browser extensions can extend the functionality of a browser for a user. For example, when a user installs a browser-executed web application or extension, increased permissions may be granted to the web application or extension to access local resources. Thus, compared to what typical markup language code executed by the browser has access to, a browser-executed web application or extension may have increased power or functionality. At times, the increased permissions granted to a web application or extension can be exploited by an attacker to perform malicious actions against the user or the user's computing device. Because of this, before browser-executed web applications and extensions are offered to a user from a controlled environment, they often are vetted to determine whether they contain code that could perform a malicious action.

For example, a party that has a stake in the performance, security, reliability of the web applications and browser extensions, including a host of an online marketplace for the web applications and browser extensions, generally may want to ensure that users of the web applications and browser extensions use high performance, secure, and reliable web applications and browser extensions, or at least that users are aware of any concerns regarding the performance, security, and reliability of web applications and browser extensions that they use. Furthermore, the marketplace operator and other parties that have stakes in the performance, security, reliability of the web applications and browser extensions also may want to ensure that web applications and browser extensions that are offered to users from locations outside of the marketplace are equally high performance, secure, and reliable web applications and browser extensions, or at least that users are aware of any concerns regarding the performance, security, and reliability of web applications and browser extensions provided from outside the marketplace.

However, an attacker may try to embed a malicious web application or extension within other executable code that is offer outside the online marketplace and which, when executed, installs the malicious web application or extension on the user's computing device.

SUMMARY

In a general aspect, a computer-implemented method includes identifying a program binary file as part of the content of the webpage accessible to a client computing device through a network, where the program binary file is offered for downloading from the webpage to the client computing device for execution by the client computing device. A browser-executable web application or browser extension that would be installed on a client computing device as a consequence of executing the program binary by the client computing device is identified, where source code for the browser-executable web application or browser extension includes scripting language code. The source code of the browser-executable web application or browser extension is re-written to include tracking code to track behavior of the browser-executable web application or browser extension during execution of the re-written browser-executable web application or browser extension. The re-written browser-executable web application or browser extension is executed in a browser run by one or more processors. Based on evaluation of results of executing the re-written browser-executable web application or browser extension it is automatically determined, by the one or more processors, whether the browser-executable web application or browser extension violates one or more predetermined conditions. Based on the determination, it is automatically determined whether to discourage downloading the program binary from the webpage to the client computing device or whether to disable execution of the browser-executable web application or browser extension on one or more client computing devices.

In another general aspect, an apparatus includes one or more memory devices arranged and configured to store executable code and one or more processors operably coupled to the one or more memory devices. The one or more processors are arranged and configured to execute the code such that the apparatus performs the actions of: identifying a program binary file as part of the content of the webpage accessible to a client computing device through a network, where the program binary file is offered for downloading from the webpage to the client computing device for execution by the client computing device; identifying a browser-executable web application or browser extension that would be installed on a client computing device as a consequence of executing the program binary by the client computing device, where source code for the browser-executable web application or browser extension includes scripting language code; re-writing the source code of the browser-executable web application or browser extension to include tracking code to track behavior of the browser-executable web application or browser extension during execution of the re-written browser-executable web application or browser extension; executing the re-written browser-executable web application or browser extension in a browser run by one or more processors; automatically determining, by the one or more processors, based on evaluation of results of executing the re-written browser-executable web application or browser extension whether the browser-executable web application or browser extension violates one or more predetermined conditions; and based on the determination, automatically determining whether to discourage downloading the program binary from the webpage to the client computing device or whether to disable execution of the browser-executable web application or browser extension on one or more client computing devices.

Implementations can include one or more of the following features. For example, the scripting language code can include JavaScript code. Disabling execution of the browser-executable web application or browser extension by the client computing device can include downloading to the client computing device a blacklist that includes the browser-executable web application or browser extension, where the blacklist instructs the client computing device to disable the browser-executable web application or browser extension from execution by the browser.

Discouraging downloading the program binary to the client computing device can include: receiving an indication from the client computing device that the program binary is proposed from downloading to the client computing device; and sending a warning to the client computing device based on the determination that the browser-executable web application or browser extension violates one or more of the predetermined conditions.

Re-writing the code of the browser-executable web application or browser extension can include re-writing the code such that symbolic information is propagated during execution of the re-written browser-executable web application or browser extension so that particular inputs to the code that exercise particular control paths in the code are identified. Executing the re-written browser-executable web application or browser extension can include interpreting code of the re-written browser-executable web application or browser extension with a scripting language interpreter that is also used to interpret the received browser-executable web application or browser extension during execution of the browser-executable web application or browser extension. An identified input to the code that exercises a particular control path can include a uniform resource locator. An identified input to the code that exercises a particular control path can include input received from a user of the browser-executable web application or browser extension.

A tainted variable in the code can be identified, and re-writing the code of the browser-executable web application or browser extension can include re-writing the code to include information to track a flow of the tainted variable during execution of the re-written code. A code operation of the re-written browser-executable web application or browser extension that is associated with the tainted variable and that leaks information associated with the tainted variable from a client computing device running the browser-executable web application or browser extension across a network to a second computing device can be identified.

Automatically determining whether the browser-executable web application or browser extension violates one or more predetermined conditions can include determining whether personal user information associated with the tainted variable is leaked from a client computing device running the browser-executable web application or browser extension across a network to a second computing device.

DETAILED DESCRIPTION

Figure 1:
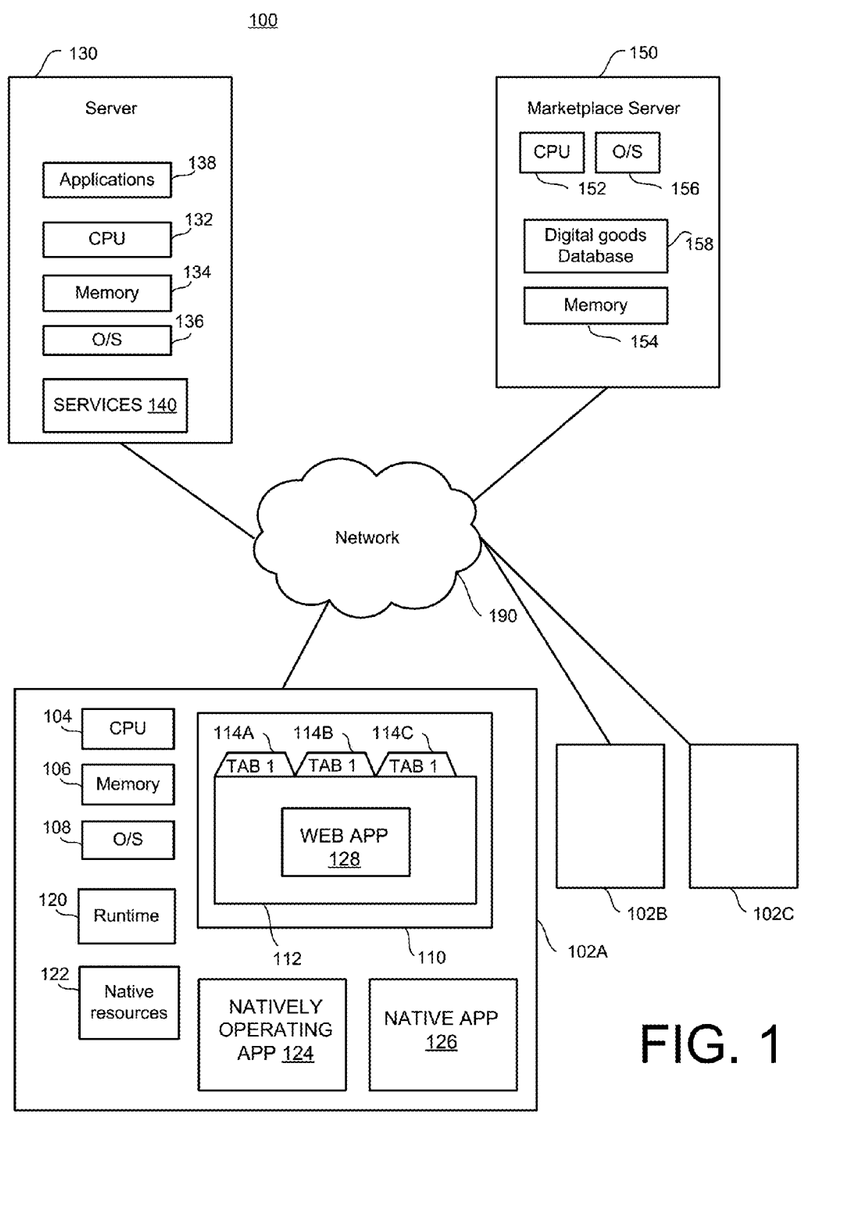
FIG. 1 is a schematic diagram of a system that may provide automatic dynamic vetting of browser extensions and web applications.

FIG. 1 is a schematic block diagram of an example implementation of a system 100 that may provide automatic dynamic vetting of browser extensions and web applications. In various implementations, the system 100 may include client computing devices 102A, 102B, 102C (such as desktop computers, notebook computers, netbook computers, tablet computers, smart-phones, etc.). A client computing device 102A can include one or more processors (CPU) 104 and one or more memories 106. The client computing device 102A can execute an operating system (O/S) 108 and various applications (110, 124, and 126) which may display a user interface window (e.g., web browser 112). The client computing device 102A can include a natively operating application 124 as well as one or more native applications 126. Application 110 is another example of a native application, and the user interface window of application 110 is a web browser. Other examples of native applications 126 include word processing applications, image editing applications, email applications, media players, calculators, etc.

In various implementations, the web browser 112 may include or execute one or more web applications 128. In this context, a "web application" may be configured to perform a single task or multiple tasks for a user. In such an implementation, the web application may be configured to be executed or interpreted by the web browser. This is compared with the native applications (e.g., native application 126) that include machine executable code and are configured to be executed directly via the operating system of the client device, whereas, a web application may be incapable of execution or display without the aid of the web browser. Thus, web applications can be run inside a browser with a dedicated user interface, and typically provide functionality and an experience that is more rich and interactive than a standalone website but are less cumbersome and monolithic than a native application 126. Examples of web applications include games, photo editors, video players, etc. that are run inside the web browser 112.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution by the browser. A packaged web application may not need to have network access to perform its functionality for the user, and rather may be executed successfully by the browser locally on the computing device without access to a network. Packaged web applications have the option of using Extension APIs, allowing packaged applications to change the way the browser behaves or looks.

In various implementations, the web browser may include or be configured to interact with one or more browser extensions. In this context, a "browser extension" may include one or more web pages packaged or grouped together as a definable whole, and configured to extend the functionality to the web browser. Thus, extensions also provide extra functionality to a browser, but generally, unlike applications, there is little or no user interface component to the functionality provided by an extension. Instead, web extensions extend the functionality of the browser and the websites being viewed in it. For example, web extensions can extend the functionality of the browser by adding a new button to the address bar, such as an ever-present currency converter. Buttons like this can also apply to the current website being viewed. For example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, and extension may be installed to embed a "mail this" button next to every link in every page. Compared to web applications, extensions cut across websites and web applications. Extensions are usually in effect across all websites (though some are site-specific). Web applications do not combine with other applications in this way. Rather, web applications run stand-alone, like any regular website. Web browser extensions and applications can be downloaded for installation in and execution by a browser running on a client computing device.

In one implementation, the client computing device 102A may be running, or causing the operating system 108 to execute, application 110 or web browser 112. In various implementations, this web browser 112 may include a plurality of panes or tabs 114A, 114B, 114C. The web browser 112 can be a visual area, usually rectangular, containing some kind of user interface. In a graphical user interface (GUI) used in the client device 102A, the web browser 112 can be a two-dimensional object arranged on a plane of the GUI known as the desktop. The web browser 112 can include other graphical objects that may be called the "chrome" of the web browser, e.g., a menu-bar, toolbars, controls, icons. The web browser may also include a working area in which a document, image, folder contents, or other main object (e.g., web application 128) can be displayed. The working area may be capable of holding only one main object (i.e., in a single document interface) or more than one main object in a multiple document interface. In some applications, specifically web browsers, multiple documents can be displayed in individual tabs 114A, 114B, 114C. These tabs 114A, 114B, 114C are typically displayed one at a time, and are selectable via a tab-bar which often resides above the contents of an individual window. That is, one selected tab 114A is "forward-facing" and displays information or content to a user in the web browser 112, with the content of other tabs 114B, 114C is "hidden." The tabs 114A, 114B, and 114C may execute in separate processes, each with its own individual memory.

The web applications 128 and browser extensions executed by the browser 112 can include code written in a scripting language, such as, JavaScript, VBScript, ActionScript, or other scripting languages.

A "natively operating application" 124 is an application that is coded using only web technology (defined here as code that can be implemented directly by a web browser), such as HTML, JAVASCRIPT, ACTIONSCRIPT, or CSS. Natively operating application 124 may be downloaded from a marketplace server 150 via a web browser, such as web browser 112, and may be installed on client computing device 102A. The natively operating application 124 may operate using runtime 120. The natively operating application 124 may be configured to be executed directly by a processor 104 or via the operating system 108 of the client device, using runtime 120, for example. Because natively operating application 124 is coded with web technologies, no compilation step is required. Instead, natively operating application 124 may simply be packaged (e.g., in a .CRX format, or zipped, for example with some signature or verification) and provided to client computing device 102A, for example via web browser 112 from a digital marketplace such as marketplace server 150, as described in more detail below. The runtime 120 may accept the natively operating application 124 as a packaged file (e.g., .CRX files) and then execute the natively operating application 124.

Runtime 120 uses a multiprocess architecture. Thus, if one natively operating application 124 crashes, a user will not lose other natively operating applications running via runtime 120. Each application operates as a new process on the single runtime.

Runtime 120 may also be downloaded from a marketplace server 150 (or another server) via a web browser, such as web browser 112, and may be installed on client computing device 102A. In some implementations, runtime 120 may already be installed on client computing device 102A when natively operating application 124 is installed. In other implementations, runtime 120 may be bundled with a single download with natively operating application 124, and/or downloaded or installed prior to installation of natively operating application 124.

Natively operating application 124 may, via runtime 120, access a network 190, and may also access one or more native resources 122 of a client computer. Native resources 122 may include any kind of resource included in or locally connected to computing device 102A. For example, native resources 122 may include native windows (e.g., any windows outside a web browser tab), a graphics processing unit (GPU), a web camera, a microphone, a printer, a file system including documents, images, other media, or other resources. Natively operating application 124 may be coded with web technologies, similar to web applications (which are described in more detail below), but in contrast to web applications, natively operating application 124 may access native resources 122 of client computing device 102A.

Additionally, natively operating application 124 may access various remote services 140 that may be accessible via remote servers. For example, as shown in FIG. 1, the system 100 can include a server 130 that includes one or more processors 132, one or more memories 134, an operating system 136, applications 138, and services 140. Services 140 may be available via server 130, for example, and services 140 may include data uploading or storage services, for example to allow a user to upload photos from client computing device 102A for storage on a remote server 130. For example, in one implementation, natively operating application 124 may automatically access photos stored in a portion of memory 106, without requiring additional input from a user (with a user's prior permission). Natively operating application 124 may automatically filter the photos from other files (e.g., based on a file type, file name, file size, or other criteria), and may also automatically upload the photos (with a user's permission) to an account associated with the user via services 140 of developer server 130, using network 190.

Other shared data services 140 may also be available, for example to provide access to a media gallery, music, or documents. A music related application, for example, may access only a portion of a file system containing music, so that the application can do something with the music such as sync the music with a user account. Using an API, for example, a natively operating application 124 can request access to all music on device 102A. The API may determine what music is stored on device 102A, and the application may get the music and sync it to a remote server (e.g., 130).

The client computing device 102A can communicate with a digital goods marketplace server 150 that provides a marketplace for digital goods (i.e., web applications, natively operating applications, and/or browser extensions) to client computing devices 102A, 102B, 102C. The marketplace server 150 can include one or more processors 152 and one or more memories 154. The marketplace server 150 can execute an operating system 156 and various applications and services to provide functionality to the client computing devices. For example, in one implementation, the marketplace server 150 can include a repository for database of digital goods 158, and the digital goods can be served from, or downloaded from, the repository to the client computing devices. In another implementation, the digital goods can be stored in, and served to client computing devices from, a repository that is remotely located from the marketplace server. For example, digital goods could be stored and served to client computing devices from individual repositories that are operated and controlled by developers of the digital goods, and digital goods repository 158 of the marketplace server 150 can provide just a reference to the individual repositories that are operated by the developers.

Figure 2:
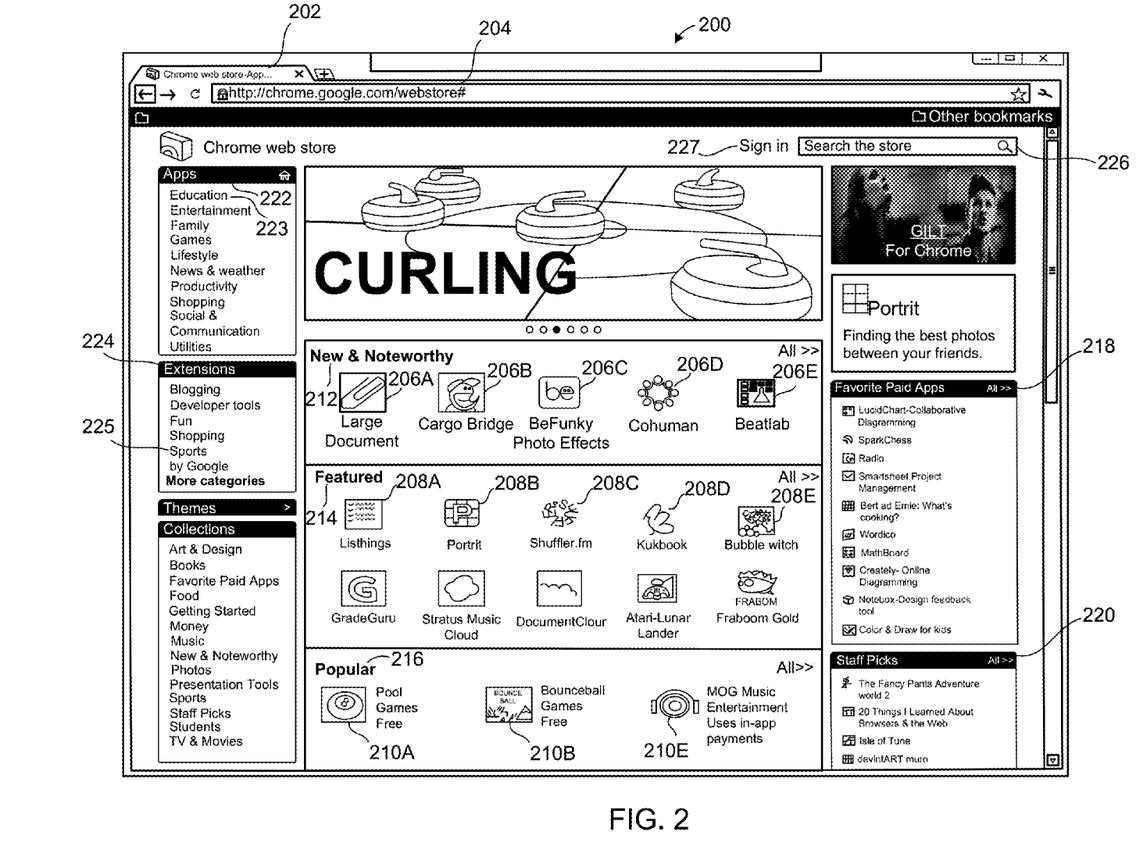
FIG. 2 is a screenshot of the user interface to a marketplace of digital goods.

FIG. 2 is a screenshot of a user interface 200 to a marketplace 150 of digital goods. As used herein "digital goods" refers to web applications, natively operating applications, and/or browser extensions. The user interface 200 can be displayed by a browser application that is executed by a computing device 102A that may be connected to a network 190 (e.g., the Internet). The browser application can open one or more tabs 202, one of which may display the user interface to the marketplace when a user navigates to a webpage identified by a uniform resource locator (URL) 204 that provides content to the browser so that the browser can display the user interface to the marketplace in the tab.

The content provided by the webpage to the user can include a plurality of icons 206A, 206B, 206C, 206D, 206E, 208A, 208B, 208C, 208D, 208E, 210A, 210B, 210C that represent digital goods that can be downloaded from the webpage by the user for execution by a computing device controlled by the user. Digital goods can include web applications, natively operating applications, and browser extensions that can be downloaded from the marketplace to a client computing device where they can be installed on the computing device for execution on the computing device, either by a browser running on the device or with the aid of a browser in the case of a natively operating application.

Within the user interface 200, the installable web applications can be displayed in a manner that is organized to help a user decide which applications may be useful or relevant to the user. For example, the user interface 200 can include a category 212 of applications 206A, 206B, 206C, 206D, 206E that have been recently released in the marketplace and which a curator of the marketplace may deem to be especially noteworthy to users. In one implementation, the applications 206A, 206B, 206C, 206D, 206E shown in the category 212 can be limited to applications that have been released in the marketplace within a recent period of time (e.g. one week, one month, three months, six months). Then, a subset of the applications that have been released into the marketplace within the recent period of time can be selected based on a variety of signals that indicate the noteworthiness of the selected applications to the user, and the selected subset of applications 206A, 206B, 206C, 206D, 206E can be displayed within the category 212. That is, the applications 206A, 206B, 206C, 206D, 206E shown in the New and Noteworthy category 212 of the user interface 200 can be a subset of a larger number of applications that also could qualify as being new and noteworthy but which have not been selected for display in the user interface 200. A variety of signals that can be used to rank and select the subset of applications as described in more detail below.

In another example, the user interface 200 can include a category 214 of applications 208A, 208B, 208C, 208D, 208E that have been selected to be featured for display in the user interface 200. The applications 208A, 208B, 208C, 208D, 208E that are selected to be featured in the category 214 can be selected based on criteria evaluated by a curator of the market place. For example, the curator may select the applications 208A, 208B, 208C, 208D, 208E for display in the category 214 from a much larger set of applications based on the curator's opinion of the quality, popularity, or utility of the selected applications.

In another example, the user interface 200 can include a category 216 of applications 210A, 210B, 210C that have been selected for display in the category 216 of the user interface 200 based on a popularity ranking of the selected applications relative to other applications. The popularity ranking can be determined based on reviews of the applications by users who have downloaded and used the applications. For example, the marketplace may request that users rate applications quantitatively using a system of one to five stars, where five stars is the highest rating, and one star is the lowest rating. Then, applications within the marketplace can be ranked based on their user rating. In one implementation, applications with the highest average rating can be ranked highest. In another implementation, applications with the highest number of five-star ratings can be ranked highest. Then, applications 210A, 210B, 210C with the highest rankings can be selected for display in the user interface 200 of the marketplace.

The user interface 200 of the marketplace also can include categories of applications in other subportions of the user interface 200 in which smaller icons are used to represent the applications that are used in categories 212, 214, 216. For example, category 218 can display "Favorite Paid Apps," which can be applications for which a user must pay money before being able to download and install the application on the user's computing device. Applications listed in the Favorite Paid Apps category 218 can be the most frequently downloaded and/or most frequently installed applications for which the user must pay money. In another example, category 220 can display "Staff Picks," which can be applications that are selected by a curator at the marketplace based on the selected applications being deemed especially interesting to users who visit the marketplace in search of applications.

Within the user interface 200, categories 212, 214, 216, 218, 220 can display a subset of applications that are categorized to fall within the category. Because screen space within the user interface is limited, only a subset of the applications that fall within a category may be displayed within the user interface 200. However, by selecting a hyperlink associated with the category, more applications that fall within the category can be displayed to a user. For example, each category 212, 214, 216, 218, 220 is associated with a hyperlink labeled "All," the selection of which may cause more applications that fall within the category to be displayed.

Other parts of the user interface 200 also can be used to organize the digital goods that are available in the marketplace. For example, an "Apps" section 222 can provide a list of hyperlinks, which each can be selected to display applications that belong to a category identified by the hyperlink. For example, selection of the "Education" hyperlink 223 can cause a group of icons that represent applications related to educational topics to be displayed. In another example, an "Extensions" section 224 can provide a list of hyperlinks, which each can be selected to display browser extensions that belong to a category identified by the hyperlink. For example, selection of the "Sports" hyperlink 225 can cause a group of icons that represent browser extensions related to sports topics to be displayed.

In addition to locating digital goods that are already displayed within a category 212, 214, 216, 218, 220 of the user interface 200 that could be displayed as a result of selecting a hyperlink 223, 225, digital goods also can be located as a result of a query for goods that may be of interest to the user. For example, a user may enter query terms into a query box 226 that may receive the query terms and pass the terms onto a search engine that then locates digital goods that match the query terms and that are available in the marketplace. For example, digital goods such as web applications can have a variety of metadata associated with them that are used to index the digital goods, and the query terms can be compared to the metadata associated with the digital goods. Based on the comparison, applications that best match the query terms can be selected from the digital goods available in the marketplace, and the selected goods can be presented to the user in the user interface 200.

The user interface 200 also includes a hyperlink 227 that can be selected so that the user can log into the marketplace. For example, selection of the hyperlink 227 can trigger the display of a prompt to the user to enter a username and password, and successful entry of the username and password may allow the user to log into a personal account associated the marketplace. As explained in more detail below, once the user is logged into the marketplace, digital goods can be selected and presented to the user within the user interface 200, where the selection of the goods can be personalized to the user based on data associated with the user's account.

The marketplace may provide a centralized repository of digital goods, which a user may use to locate and identify digital goods that may be installed for use by the user on a client computing device. An operator of the marketplace may want to ensure that the digital goods found in the marketplace conform to certain quality standards and do not pose a threat to the consumers of the goods. To this end, digital goods that are provided (e.g., by developers of the goods) for listing in the marketplace may be automatically vetted to screen for digital goods that may be malicious prior to listing the digital goods in the marketplace.

In addition, browser-executed web applications and browser extensions that may be available outside of the marketplace for downloading to, and installation on, a client computing device may be discovered and vetted for malicious behavior. For example, browser-executed web applications and browser extensions that are installed on the user's local machine as a result of the execution of a downloaded binary file (e.g., a file containing compiled instructions that run natively on the machine) that is available through a network, e.g. the Internet, can be vetted. When such web applications and browser extensions are determined to be malicious, then appropriate action may be taken. For example, a user can be warned about the presence of a malicious web application or browser extension that is included within a program binary, even when the program binary itself is not malicious. In another implementation, malicious web applications and browser extensions that have been installed as a result of executing a program binary can be automatically removed.

Figure 3:
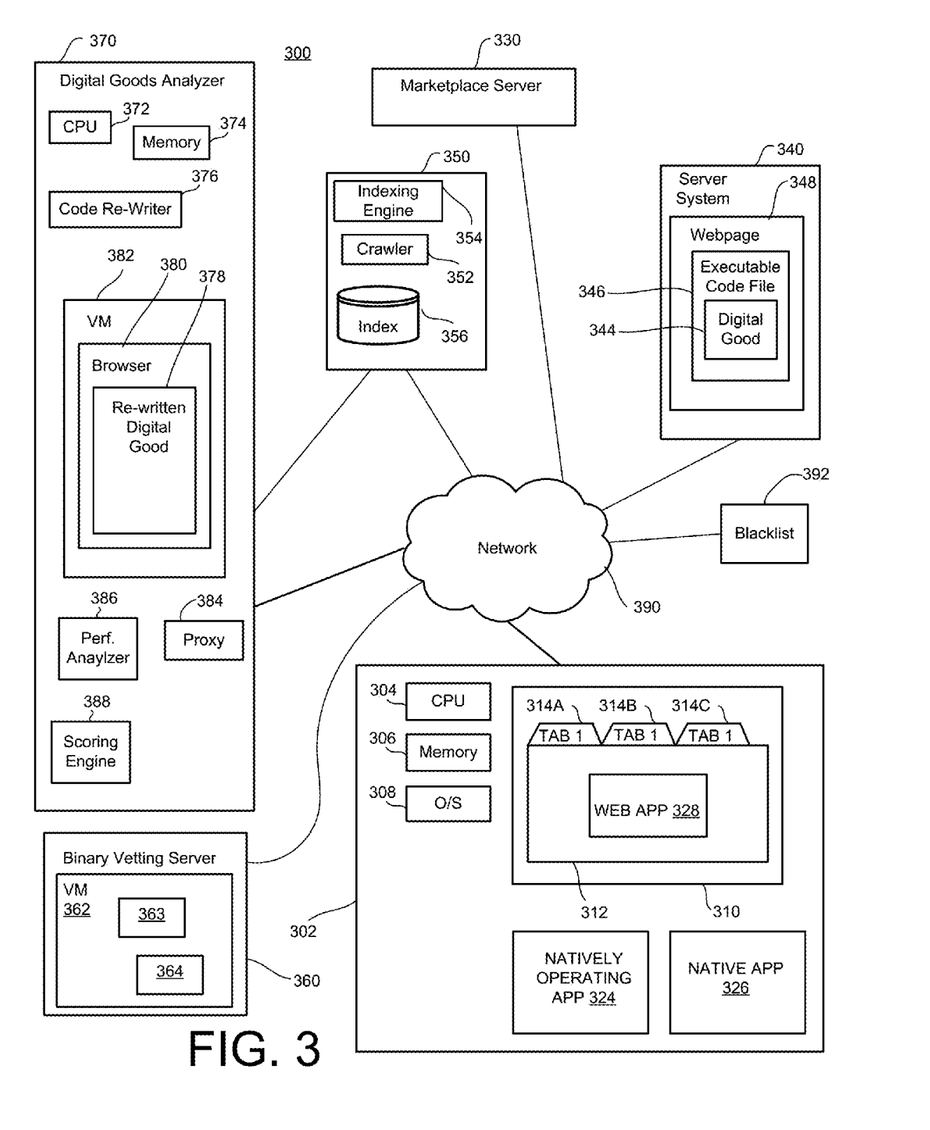
FIG. 3 is a schematic diagram of a system that may provide automatic dynamic vetting of browser extensions and web applications.

FIG. 3 is a schematic diagram of a system 300 that may provide automatic dynamic vetting of browser extensions and web applications that are provided, or offered, to a client computing device operated by a user from locations other than the marketplace server. The system 300 can be used to test digital goods (i.e., web applications, natively operating applications, and/or browser extensions) that are provided to users, with or without the users' knowledge, and checks whether the digital goods meet certain quality standards and/or checks that the digital goods do not contain malicious or suspicious code.

The system 300 can include a marketplace server 330, a server system 340, an indexing system 350, a digital goods analyzer 370, a binary vetting server 360, and a client computing device 302. The marketplace server 330 can be similar, or identical, to marketplace server 150 shown in FIG. 1. The client computing device 302 can be similar or identical to device 102A and can contain similar elements to those included in device 102A. For example, device 302 can include a processor 304 configured for executing instructions, a memory 306 configured for storing instructions, and an operating system 308. The processor 304, the memory 306, and the operating system 308 can be used in conjunction for executing a web application 328 or browser extension in a web browser 312 that may include tabs 314A, 314B, 314C. Web browser 312 is a type of application 310 that can be executed by a processor 304. In addition, processor 304 can execute a natively operating application 324 or a native application 326.

The server system 340 can host a webpage 348 that may provide access to a program binary file 346 that may include executable statements that would cause, when the statements are executed, a digital good (e.g., a browser-executed web application or browser extension) 344 to be installed on a user's client computing device 302. The server system 340 and the webpage can be unaffiliated with, and uncontrolled by, the marketplace server 150. The executable code 346 can be offered for download from the server system 340 over the network 390 to the client device 302 for installation on, and execution by, the client device 302. Thus, the client computing device 302 can navigate to the webpage 348 and download the program binary file 346 from the webpage 348, and then the digital good 344 may be installed on the client computing device 302 as a result of execution of the program binary 346. The digital good 344 can include source code files, metadata files, configuration files, a manifest file, resources (such as images, texts, etc.) that are necessary to execute the digital good on client 302.

To identify files of executable code that include malicious browser-executed web applications or browser extensions, program binary files are identified, the program binary files are analyzed to determine whether they include code that would install a browser-executed web application or browser extension on a user's client computing device, and the would-be web application or browser extension is analyzed to determine whether it is potentially malicious.

For example, to identify program binary files, a message can be received from local client computing devices whenever a client computing device downloads a program binary file. For example, the browser 312 through which the binary file is downloaded can send a message through the network 390 to the digital goods analyzer 370 or to another server to indicate that a program binary file has been downloaded to the client computing device 302. The received message can include the location (URL, domain name, IP address, etc.) from which the program binary file is downloaded and/or other metadata that may be used to identify the location of the downloaded program binary file.

In another example, an indexing system 350 that crawls and indexes digital content accessible over the network 390 (e.g., the Internet) that connects a large number of servers (e.g., server system 340) to client computing devices (e.g., device 302) can include a web crawler 352 that navigates to a large number of webpages 348 and that provides the content of the webpages to an indexing engine 354 that creates an index 356 of the crawled webpages. The indexing system can include functionality in the crawler 352, in the indexing engine 354, or in one or more different components that analyzes the content of a crawled webpage and determines whether the crawled content appears to include a program binary file. For example, the crawler 352 can parse the content of a crawled webpage to search for files having filenames with extensions such as, for example, AIR, APP, BIN, EXE, JAR, JS, JSE, NEXE, OSX, PRG, RUN, VBS, etc. To identify program binary files that are embedded in archives (e.g., *.zip or *.rar files), the crawler 352 can download archive files to a virtual machine, extract the content from the archive files, and determine whether the extracted content includes an executable file.

Once program binary files are identified by the web crawler 352, they can be passed to the binary vetting server 360 that analyzes the program binary files for potential malicious content or conduct when executed by a client computing device 302. The binary vetting server can include a virtual machine 362, within which a binary analyzer 363 runs, and that can run the program binary file to determine whether the file contains malicious content or performs malicious actions when executed by a client computing device. If so, appropriate action can be taken to warn users about the existence of the malicious program binary file on a webpage or to block users from accessing or downloading the malicious program binary file. However, even if the binary analyzer 363 determines that the program binary file does not contain malicious content and does not perform malicious actions, further checks may be performed to determine whether the program binary file installs a browser-executable web application or browser extension on the user's client computing device and whether that web application or browser extension is potentially malicious.

The virtual machine 362 also can include a digital goods identifier 364 that identifies browser-executable web applications and/or browser extensions that are contained in the program binary file. For example, the digital goods identifier 364 can monitor the execution of the program binary file 346 by the virtual machine 362 to determine whether the execution of the file 346 includes the execution of statements that would cause a browser-executable web application or browser extension to be installed on a client computing device. In another implementation, the digital goods identifier 364 can analyze output resulting from the execution of the file 346 to determine whether the output includes a manifest file of a browser-executable web application or browser extension, where the existence of the manifest file can indicate the presence of a browser-executable web application or browser extension that is likely to be installed on a client computing device. In another implementation, the digital goods identifier 364 may monitor the output resulting from the execution of the file 346 to determine whether files are copied to locations on the client computing device that are typically used to store browser-executable web applications and/or browser extensions.

In some implementations, the determination that a program binary file hosted by the server system 340 that causes a browser-executable web application or browser extension to be installed on a client computing device can cause the browser-executable web application or browser extension to be flagged as potentially malicious, such that further action must be taken, even without additional analysis of the web application or browser extension. For example, users can be discouraged from downloading program binary files to their computing device 302 if execution of the file causes a browser-executable web application or browser extension to be installed on a client computing device.

Discouraging the downloading of the program binary files 346 from the server system 340 to the client computing device can be implemented in a variety of different ways. For example, a blacklist of program binary files that cause a browser-executable web application or browser extension to be installed on a client computing device can be maintained in an online repository 392, and when a user begins a downloading process of a program binary file 346 a query about the status of the can be sent from the client computing device 302 to the repository. The query may identify the program binary file 346 by the URL of its host site, the IP address of the host site, the size of the file, and/or other parameters. If a match is found in the blacklist repository, a warning message may be displayed to the user on the client computing device to discourage the user from downloading the file 346.

In some implementations, if the digital goods identifier 364 determines that execution of the program binary file 346 appears to cause a browser-executable web application or browser extension to be installed on a client computing device 302, the binary may not be flagged automatically as a potentially malicious file. Rather, the identified browser-executable web application or browser extension can be passed to the digital goods analyzer 370 for analysis and vetting. Thus, even if execution of the program binary file 346 in and of itself is determined by the binary vetting server 360 to be benign, any browser-executable web applications or browser extensions that are identified as resulting from the execution of the accessible code file 346 can be investigated to determine whether they might be potentially malicious.

In some implementations, upon the identification of a digital good (i.e., a browser-executable web application or browser extension) 344 that is installed as a consequence of running the program binary file 346 that is offered by the third-party server system 340, an automatic vetting process of the digital good can be initiated. The automatic vetting process can be performed by an analysis server 370 that includes one or more memories 374 configured for storing executable code and one or more processors 372 configured for executing the code. In one implementation, the analysis server 370 can automatically dynamically test a digital good that is identified by the digital goods identifier 364 as being installed as a consequence of running the program binary file 346 hosted by server system 340. The testing can include determining whether the digital good violates one or more predetermined conditions that would trigger discouraging downloading the digital good from the server system 340 to the client computing device 302 or executing the digital good by the client computing device.

The identified digital good can be received by the analysis server 370 in a package format, and a file extractor can extract files from the package. The file extractor can extract the manifest file for the digital good, which can include information such as the title, version and build data of the digital good, and the location path to source code files that are included in the package. To extract source code files of the digital good, the file extractor can access the manifest file to retrieve a listing of files that include source code. In another implementation, the file extractor can scan file extensions of the files included in the digital good package and identify files with extensions specific to source code files.

Source code of the received digital good can be rewritten by a code rewriter 376 to include code to track behavior of the digital good during execution of the rewritten digital good. The rewritten code of the digital good can be executed by the analysis server 370. In some implementations, the rewritten code 378 of the digital good can be executed by a browser 380 that runs within a virtual machine 382 of the analysis server 370. While the rewritten digital good 378 executes within the browser 380, it can connect to a network 390, such as the Internet, through a proxy 384. While the rewritten digital good 378 executes, its dynamic behavior can be logged and analyzed by a performance analyzer 386.

Based on evaluation of results of executing the rewritten digital good 378, an automatic determination (i.e., without human input or intervention) can be made about whether the digital good, available via the program binary file 346 hosted on the third-party server system 340, would violate one or more predetermined conditions that are relevant to whether the digital good would be harmful when installed on a client computing device 302. Then, based on evaluation of results of whether the digital good violates a predetermined condition, an automatic determination (i.e., without human input or intervention) can be made whether to discourage downloading the program binary from the server system 340 to the client computing device 302 or execution of the digital good by the client computing device.

Digital goods that utilize scripting language source code (e.g., JavaScript) can receive a variety of inputs that can be used as values for variables in the source code. For example, JavaScript event handlers may execute as a result of user actions such as clicking buttons or submitting forms that are presented to the user when the code is executed. In addition, JavaScript can accept user input, such as, for example, text input by a user as values for variables in the code. JavaScript can also accept uniform resource locators (URLs) as values for variables in the code, and information hosted on other tabs or frames, different from the tab or frame in which the JavaScript code of the digital good executes, can communicate with JavaScript code of the digital good through inter-frame communication abstractions such as URL fragment identifiers and the PostMessage operation of HTML 5. All of these various inputs to the scripting language code can influence the dynamic behavior of the digital good, sometimes in ways that are difficult to foresee. Therefore, the analysis server 370 can be used to evaluate automatically all, or at least a large number of the control paths of the digital good and determine the inputs that influence the control path taken by the digital goods during execution of its code.

To do this, the code rewriter 376 can rewrite source code of the digital good that is installed as a result of executing the program binary 346 to replace certain inputs with symbolic variables, so that symbolic information is propagated during execution of the rewritten digital goods. Then, whenever an operand of a JavaScript operation is symbolic, the operation can be simulated by creating a formula for the result of the operation in terms of symbolic information used for the operands. When a symbolic value is propagated to a node of the control path for the code of the digital good from which multiple branches occur, the performance analyzer 386 can determine the inputs that would cause the code execution to propagate down each branch.

Nodes in the control path can be associated with control words in the source code. For example, control words in a JavaScript code many include "if", "else", "for", "ease", "switch", "default", "break", etc. Control words are specific to a particular programming language used to for the source code of a digital good. Thus, while the rewritten source code is executed, the performance analyzer 386 can monitor the propagation of symbolic information to determine which symbols, corresponding to variables in the code of the digital good that is installed as a result of executing the program binary 346, influence the control paths taken by the executed code. This symbolic execution of the rewritten code can be used to fully execute all possible control code paths in the source code of the digital good that is installed as a result of executing the program binary 346.

For example, in the source code statement:

if var v=(x>1) f(a): f(b), the word "if" can be identified as a control word by performance analyzer 386, and the performance analyzer can determine that when the first expression (x>1) is true, variable "v" is set to the second expression (v=f(a)), but if the first expression is false, "v" is set to the third expression (v=f(b)). Thus, for each control statement, or node in the control path, the performance analyzer 386 analyzes the dynamic behavior of the digital good. The source code statement above can be presented graphically as in the diagram below, where the "x>1" block represents a node of the control graph and the "v=f(a)" and "v=f(b)" blocks represent two branches of the graph.

By rewriting the digital good such that symbolic information is propagated during execution of the rewritten digital good, a standard JavaScript interpreter can be used to interpret the rewritten digital good. In other words, a JavaScript interpreter that is used to interpret the digital good can also be used to interpret the code of the rewritten digital good and a special interpreter need not be used.

The symbolic execution techniques described above can be used to automatically determine control paths in the code of a digital good that is installed as a result of executing the program binary 346. Then, certain of the determined control paths can be executed within the virtual machine 382, and the results of that execution can be used to determine whether the digital good violates one or more predetermined conditions that would that would trigger discouragement of the downloading and or executing of the digital good that is installed as a result of executing the program binary 346. In some implementations, control paths that include operations may be flagged as potentially suspicious, either because of what the operation does or because of the inputs that the operation uses to perform its function. Such control paths that include potentially suspicious operations can be executed within the virtual machine 382 to observe the dynamic behaviour of the digital good. During execution of the rewritten digital good within the virtual machine 382 the browser 380 can connect to the network 390 through a proxy 384, so that known and validated content can be provided to the digital good 378 during its execution. While the digital good 378 executes, the performance analyzer 386 can monitor the dynamic behaviour of the digital good that is installed as a result of executing the program binary 346, including the behaviour of the potentially suspicious operations.

Monitoring the dynamic behaviour of the digital good can include logging network requests made by the digital good, logging writes made to local storage, recording dialog boxes that appear as a result of the execution of the code, etc.

Because the symbolic execution techniques can be used to determine the inputs that determine which particular control paths are taken during execution of the digital good, the inputs that cause anomalous or undesirable behaviors in the execution of the digital good that is installed as a result of executing the program binary 346 can be quickly and automatically identified. For example, the performance analyzer 386 may list a digital good having a code block that executes only when a URL input is equal to a particular value as a predetermined condition to look for during dynamic execution of the rewritten digital good. Such a digital good may operate benignly in nearly all cases, except when a URL input is equal to a particular value (e.g., "www.facebook.com"), and then in the anomalous case the digital good may perform undesirable actions (e.g., sending spam, sending unwanted ads, or automatically downloading a new digital good). In another example, the performance analyzer 386 may list a digital good having a code block that prompts a user to download and install a program binary file as a predetermined condition to look for during dynamic execution of the rewritten digital good. The performance analyzer 386 may automatically detect digital goods that include such anomalous behavior through the symbolic execution techniques described herein.

The automatic detection of such anomalous behavior(s) of a digital good that is installed as a result of executing the program binary 346 provides conservative signals for use by a scoring engine 388 that determines whether to discourage downloading and/or execution of the digital good. The scoring engine 388 can receive as inputs signals of various anomalous behaviors of a digital good that is installed as a result of executing the program binary 346, and can process the signals to determine whether the digital good should be discouraged from being downloaded to, or executed by, the client computing device 302. For example, if no anomalous behaviour of a digital good is detected by the performance analyzer 386, the scoring engine 388 may generate a score for the digital good that would take no action with respect to the digital good. In another example, if anomalous, but benign, behaviour of a digital good (e.g., hyperlinks within a web application digital good are presented in red, rather than blue, font), the scoring engine 388 may generate a score for the digital good that take no action against the digital good. In another example, if anomalous behaviour that is known to be deliberately malicious is detected for a digital good that is installed as a result of executing the program binary 346, the digital good can be automatically discouraged from being downloaded to, or executed by, the client computing device 302. In another example, if anomalous behaviour is detected, the result of which is potentially dangerous or unknown, the digital good can be flagged for manual review before the digital good will be discouraged. In still another example, if certain known anomalous behaviour is detected for a digital good that is installed as a result of executing the program binary 346, a warning to the user of the client computer device 302 about the anomalous behaviour of the digital good can be provided when the user seeks to download the program binary 346, which installs the digital good 344, from the webpage 348. For example, a digital good might provide a service that would be useful or desirable to advanced user but that would be confusing and/or useless for a beginner user.

Rewriting of a digital good also can be used to automatically detect leaks of sensitive information from a digital good executing on a computing device 302 across a network 390 to a third-party site. Rewriting of a digital good in this manner can be known as "taint tracking" in which the flow of information within, and out of, a digital good can be monitored automatically. For example, a "taint" property can be added by code rewriter 376 to tainted variables (e.g., variables that received and/or store personal and sensitive information of a user) that are identified in the code of the digital. An example tainted variable is a variable that receives the results of a function such as "GetBrowserBookmarks( )" or "GetBrowserCookies( )." Other examples of tainted variables include those variables that receive or store personal or sensitive information of the user such as, for example, information about a user's browsing history a user's browser bookmarks, a user's cookies, HTML forms, user preferences, saved passwords, a user's keyboard or mouse movements, HTML data, URLs associated with a user, etc. Tainted variables may be copied, replicated, or sent to another variable. For example, in the source code below
   var x="GetBrowserBookmarks( )";
   // some source code
   var a=GetData ( );
   Var y=x+a;
variable "x" is a tainted variable because it receives a listing of the user's bookmarks and the browser that executes the code. Variable "y" is also a tainted variable because it is set, at least in part, to the data in variable "x."

When the scripting language of the digital good is JavaScript, primitive datatypes can be rewritten as objects and a "taint" property can be added to each object. For example, the "document.cookie", which represents a primitive data type can be rewritten as an object, so that the result of the operation read(document.cookie) returns an object rather than a primitive string, and the object can contain extra information that identifies the result of the operation as a tainted variable.

Performance analyzer 386 also can determine operations in the source code that act as sinks for tainted sources and transmit personal or sensitive information of a user. For example, the operation XMLHttpRequest( ) can act as a sink of personal or sensitive information. The cross-origin XML HttpRequest permission may be used to enable a web application or an extension application to request access to remote servers outside of its origin.

Rewritten code of a digital good that is installed as a result of executing the program binary 346 can be executed, and the taint property can be propagated through operations of the code as the code executes. The performance analyzer 386 can monitor when the tainted source is passed through a sink such that information is leaked from the digital good across a network. Based on evaluation of results of executing the rewritten code of the digital good the performance analyzer 386 can make an automatic determination of whether the digital good violates one or more predetermined conditions (e.g., whether personal user information associated with a tainted variable is leaked from the digital good across a network). Then, based on the determination of whether the digital good violates one or more of the predetermined conditions the scoring engine 388 can score the digital good that is installed as a result of executing the program binary 346. The score then can be used to automatically determine whether to whether to discourage downloading the digital good to, or execution of the digital good by, the client computing device 302.

Discouraging the downloading from the server system 340 to the client computing device of the program binary 346 that installs the digital good 344 or discouraging execution of the digital good 344 by the client computing device 302 can be implemented in a variety of different ways. For example, in one implementation, the digital goods analyzer 370 can maintain (e.g., in memory 374) a blacklist of program binaries digital goods that have been determined to install digital goods that violate one or more of the predetermined conditions and/or of the digital goods that are installed by the program binaries. In other implementations, the blacklist can be maintained by another entity 392. The blacklist can be automatically downloaded periodically via a push mechanism to client computing devices, including the client computing device 302, and the client computing devices that receive the blacklist can uninstall and delete, or to otherwise disable from execution by the browser 312, any digital good present on the blacklist that had been previously been installed as a result of executing the blacklisted program binary file.

In another implementation, when a user navigates to a webpage 348 that includes the program binary file 346, whose execution installs the digital good on the client computing device 302, the user may begin a downloading process of the program binary file 346. Beginning the downloading process can trigger the automatic sending of a message from the client computing device 302 to the digital goods analyzer 370 or to the repository 392. However, during the process, if it has been determined that the digital good 344 violates one or more predetermined conditions, before the digital program binary file is downloaded to the client computing device 302, a warning can be sent to the client device 302 to caution the user of the device about the risks of downloading and installing the digital good. In some implementations, the warning can be sent from the digital goods analyzer 370 to the client computing device 302.

Figure 4:
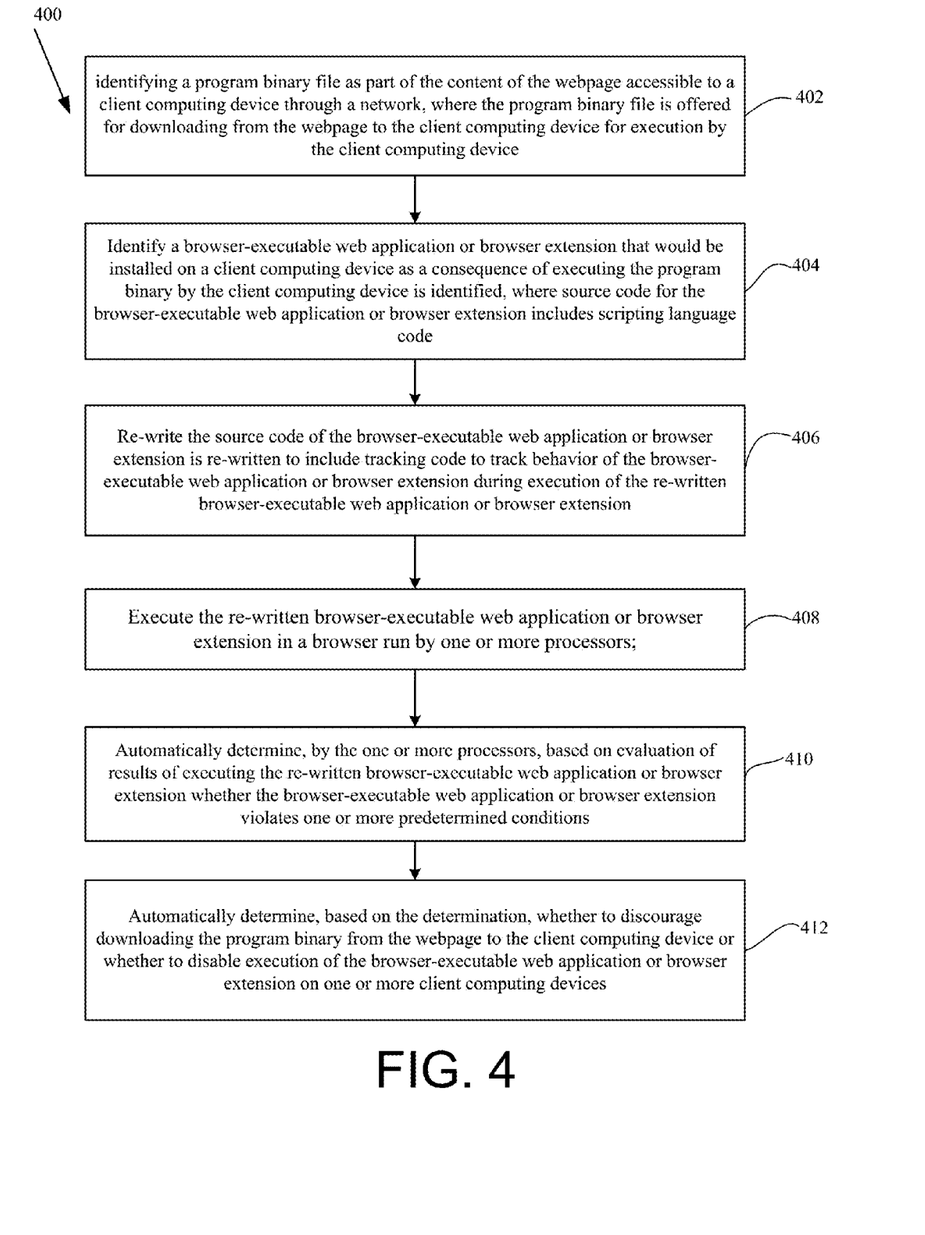
FIG. 4 is a flowchart of a process that implements techniques described herein.

FIG. 4 is a flowchart of a process 400 that implements techniques described herein. The process 400 includes identifying a program binary file as part of the content of the webpage accessible to a client computing device through a network, where the program binary file is offered for downloading from the webpage to the client computing device for execution by the client computing device (402). A browser-executable web application or browser extension that would be installed on a client computing device as a consequence of executing the program binary by the client computing device is identified, where source code for the browser-executable web application or browser extension includes scripting language code (404). The source code of the browser-executable web application or browser extension is re-written to include tracking code to track behavior of the browser-executable web application or browser extension during execution of the re-written browser-executable web application or browser extension (406). The re-written browser-executable web application or browser extension is executed in a browser run by one or more processors (408). Based on evaluation of results of executing the re-written browser-executable web application or browser extension it is automatically determined whether the browser-executable web application or browser extension violates one or more predetermined conditions (410). Based on the determination, it is automatically determined whether to discourage downloading the program binary from the webpage to the client computing device or whether to disable execution of the browser-executable web application or browser extension on one or more client computing devices (412).

Figure 5:
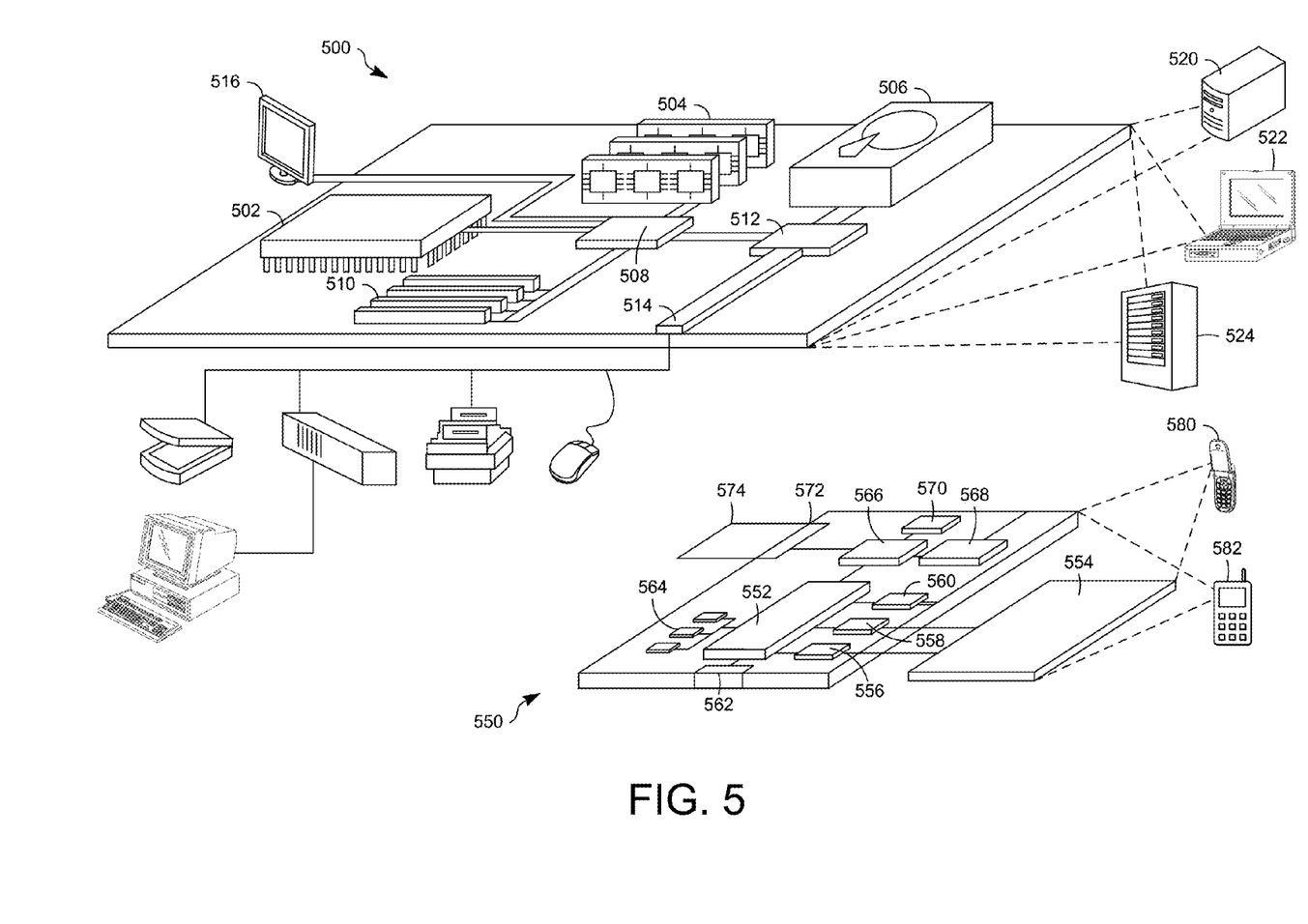
FIG. 5 is a schematic diagram of an exemplary computer systems that may provide automatic dynamic vetting of browser extensions and web applications.

FIG. 5 shows an example of a generic computing device 500 and a generic mobile computing device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, BLUETOOTH, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may also include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" or "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   identifying a program binary file as part of content of a webpage accessible to a client computing device through a network, wherein the program binary file contains compiled instructions that run natively on a computing machine and is offered for downloading from the webpage to the client computing device for execution by the client computing device;
   analyzing the program binary file, the analyzing including identifying a tainted variable in source code associated with a browser-executable web application or browser extension that is installable on a client computing device as a consequence of executing the program binary file by the client computing device;
   re-writing the source code of the browser-executable web application or browser extension to include information to track a flow of the tainted variable during execution of the re-written browser-executable web application or browser extension;
   executing the re-written browser-executable web application or browser extension in a browser run by one or more processors;
   automatically determining, by the one or more processors, based on evaluation of results of executing the re-written browser-executable web application or browser extension whether the browser-executable web application or browser extension violates one or more predetermined conditions; and
   based on the determination, automatically determining whether to discourage downloading the program binary file from the webpage to the client computing device or whether to disable execution of the browser-executable web application or browser extension on one or more client computing devices.

2. The method of claim 1, wherein identifying the program binary file includes crawling content of the webpage accessible to the client computing device through a network and determining whether one or more browser-executable web applications or browser extensions in the program binary file include source code for performing malicious actions.

3. The method of claim 1, wherein the source code includes scripting language code and the scripting language code includes JavaScript code.

4. The method of claim 1, wherein disabling execution of the browser-executable web application or browser extension by the client computing device includes:
   downloading to the client computing device a blacklist that includes the browser-executable web application or browser extension, wherein the blacklist instructs the client computing device to disable the browser-executable web application or browser extension from execution by the browser; and
   automatically removing the browser-executable web application or browser extension on the one or more client computing devices in response to determining that the program binary file was executed and found to be malicious.

5. The method of claim 1, wherein discouraging downloading the program binary to the client computing device includes:
   receiving an indication from the client computing device that the program binary is proposed from downloading to the client computing device; and
   sending a warning to the client computing device based on the determination that the browser-executable web application or browser extension violates one or more of the predetermined conditions.

6. The method of claim 1, wherein re-writing the code of the browser-executable web application or browser extension includes re-writing the code such that symbolic information is propagated during execution of the re-written browser-executable web application or browser extension so that particular inputs to the code that exercise particular control paths in the code are identified.

7. The method of claim 6, wherein executing the re-written browser-executable web application or browser extension includes interpreting code of the re-written browser-executable web application or browser extension with a scripting language interpreter used to interpret the browser-executable web application or browser extension during execution of the browser-executable web application or browser extension.

8. The method of claim 6, wherein an identified input to the code that exercises a particular control path includes a uniform resource locator.

9. The method of claim 6, wherein an identified input to the code that exercises a particular control path includes input received from a user of the browser-executable web application or browser extension.

10. The method of claim 1, further comprising identifying a code operation of the re-written browser-executable web application or browser extension that is associated with the tainted variable and that leaks information associated with the tainted variable from a client computing device running the browser-executable web application or browser extension across a network to a second computing device.

11. The method of claim 1, wherein automatically determining, by one or more processors of the computing system, based on evaluation of results of executing the re-written browser-executable web application or browser extension whether the browser-executable web application or browser extension violates one or more predetermined conditions includes determining whether personal user information associated with the tainted variable is leaked from a client computing device running the browser-executable web application or browser extension across a network to a second computing device.

12. An apparatus comprising:
one or more memory devices arranged and configured to store executable code; and
one or more processors operably coupled to the one or more memory devices, the processors being arranged and configured to execute the code such that the apparatus performs the actions of:
identifying a program binary file as part of content of a webpage accessible to a client computing device through a network, wherein the program binary file contains compiled instructions that run natively on a computing machine and is offered for downloading from the webpage to the client computing device for execution by the client computing device;
analyzing the program binary file, the analyzing including identifying a tainted variable in source code associated with a browser-executable web application or browser extension that is installable on a client computing device as a consequence of executing the program binary by the client computing device;
re-writing the source code of the browser-executable web application or browser extension to include information to track a flow of the tainted variable during execution of the re-written browser-executable web application or browser extension;
executing the re-written browser-executable web application or browser extension in a browser run by one or more processors;
automatically determining, by the one or more processors, based on evaluation of results of executing the re-written browser-executable web application or browser extension whether the browser-executable web application or browser extension violates one or more predetermined conditions; and
based on the determination, automatically determining whether to discourage downloading the program binary from the webpage to the client computing device or whether to disable execution of the browser-executable web application or browser extension on one or more client computing devices.

13. The apparatus of claim 12, wherein identifying the program binary file includes crawling content of the webpage accessible to the client computing device through a network and determining whether one or more browser-executable web applications or browser extensions in the program binary file include source code for performing malicious actions.

14. The apparatus of claim 12, wherein the source code includes scripting language code and the scripting language code includes JavaScript code.

15. The apparatus of claim 12, wherein disabling execution of the browser-executable web application or browser extension by the client computing device includes:
downloading to the client computing device a blacklist that includes the browser-executable web application or browser extension, wherein the blacklist instructs the client computing device to disable the browser-executable web application or browser extension from execution by the browser; and
automatically removing the browser-executable web application or browser extension on the one or more client computing devices in response to determining that the program binary file was executed and found to be malicious.

16. The apparatus of claim 12, wherein discouraging downloading the program binary to the client computing device includes:
receiving an indication from the client computing device that the program binary is proposed from downloading to the client computing device; and
sending a warning to the client computing device based on the determination that the browser-executable web application or browser extension violates one or more of the predetermined conditions.

17. The apparatus of claim 12, wherein re-writing the code of the browser-executable web application or browser extension includes re-writing the code such that symbolic information is propagated during execution of the re-written browser-executable web application or browser extension so that particular inputs to the code that exercise particular control paths in the code are identified.

18. The apparatus of claim 17, wherein executing the re-written browser-executable web application or browser extension includes interpreting code of the re-written browser-executable web application or browser extension with a scripting language interpreter used to interpret the browser-executable web application or browser extension during execution of the browser-executable web application or browser extension.

19. The apparatus of claim 17, wherein an identified input to the code that exercises a particular control path includes a uniform resource locator.

* * * * *